United States Patent

Nagata et al.

[11] Patent Number: 5,845,560
[45] Date of Patent: Dec. 8, 1998

[54] SWASH-PLATE TYPE COMPRESSOR WITH AN ABRASION RESISTANT PROJECTING PORTION ON THE CYLINDER BLOCK

[75] Inventors: Hiromi Nagata; Yuji Kaneshige; Masaaki Nishimoto; Hayato Ikeda, all of Kariya; Nobuhiro Ishizaka, Minato-ku, all of Japan

[73] Assignees: Kabushiki Kaisha Toyoda Jidoshokki Seisakusho, Kariya; Showa Denko K.K., Tokyo, both of Japan

[21] Appl. No.: 926,667

[22] Filed: Sep. 9, 1997

Related U.S. Application Data

[63] Continuation of Ser. No. 623,669, Mar. 28, 1996, abandoned, which is a continuation of Ser. No. 260,565, Jun. 16, 1994, abandoned.

[30] Foreign Application Priority Data

Jun. 21, 1993 [JP] Japan .................................... 5-149511

[51] Int. Cl.$^6$ ........................................................ F01B 3/00
[52] U.S. Cl. ...................... 92/71; 92/169.1; 29/888.02; 417/269
[58] Field of Search ................ 92/71, 169.1; 29/888.02, 29/888.06; 417/269

[56] References Cited

U.S. PATENT DOCUMENTS

| | | | |
|---|---|---|---|
| 4,068,645 | 1/1978 | Jenkinson | 92/169.1 |
| 4,297,976 | 11/1981 | Bruni et al. | 92/169.1 |
| 4,434,014 | 2/1984 | Smith | 148/3 |
| 4,650,644 | 3/1987 | Huret et al. | 419/11 |
| 5,057,274 | 10/1991 | Futamura et al. | 420/534 |
| 5,217,546 | 6/1993 | Eady | 148/549 |

FOREIGN PATENT DOCUMENTS

| | | |
|---|---|---|
| 1521939 | 10/1970 | Germany . |
| 2408276 | 8/1975 | Germany . |
| 3904240 | 2/1989 | Germany . |
| 119609 | 10/1976 | Japan . |
| 62-51776 | 6/1987 | Japan . |
| 4-41261 | 9/1992 | Japan . |
| 441261 | 9/1992 | Japan . |

*Primary Examiner*—Thomas E. Denion
*Attorney, Agent, or Firm*—Burgess, Ryan & Wayne

[57] ABSTRACT

It is an object of the present invention to reduce the abrasion at a pressure receiving portion of the cylinder block, without increasing the manufacturing cost, even when the outer rings of a bearing are jointly rotated and eccentrically fluctuated. The cylinder blocks are made of aluminum alloy comprising, by weight, 1.5 to 3.5% of Cu, 13 to 16% of Si, 0.5% or less of Mg, 1.0% or less of Zn, 1.0% or less of Fe and the remainder of Al. The matrix, except for primary Si crystal, is relatively soft. Primary Si crystals which each independently project from the pressure receiving portions tend to be pushed into the base material by the outer rings of the thrust bearings, so that the levels of primary Si crystals are easily made to be approximately uniform. As a result, the interference and thrust load from the outer rings can be appropriately supported by a large number of primary Si crystals, and a jointly rotating motion and an eccentric fluctuation can be appropriately supported by a large number of primary Si crystals under severe operating conditions.

3 Claims, 2 Drawing Sheets

5,845,560

SWASH-PLATE TYPE COMPRESSOR WITH AN ABRASION RESISTANT PROJECTING PORTION ON THE CYLINDER BLOCK

This application is a continuation of application Ser. No. 08/623,669, filed Mar. 28, 1996, which application is a continuation of application Ser. No. 08/260,565, filed Jun. 16, 1994, both now abandoned.

BACKGROUND OF THE INVENTION

1. Field of the Invention

The present invention relates to a swash-plate-type compressor for use in a car air conditioner, and more particularly relates to improvements for strength and abrasion resistance in a bearing portion for supporting the thrust load of the swash plate.

2. Description of the Prior Art

As an example is shown in FIG. 1, a swash-plate-type compressor (simply referred to as a compressor hereinafter) widely used for such as a car air conditioner, which is disclosed in Japanese Unexamined Patent Publication (Kokai) No. 62-51776, includes a swash plate 16 mounted on a drive shaft 14 supported by both cylinder blocks 10, 12. The swash plate 16 and thrust bearings 20, 20 provided on both sides thereof are held when both cylinder blocks 10, 12 and both housings 22, 24 disposed outside of the cylinder blocks are jointly tightened by through-bolts 26.

As shown in an enlarged view of FIG. 2 in which a portion of the thrust bearing 20 is illustrated, the thrust bearing 20 includes: an inner ring 20a telescoped to the drive shaft 14 while a predetermined interference is given; an outer ring 20b telescoped to the drive shaft 14 while a predetermined clearance is given; and needle rollers 20c held by these inner and outer rings 20a, 20b. A contacting surface 12b is extendedly provided in a pressure receiving portion 12a of the cylinder block 12 formed around the drive shaft 14, wherein the contacting surface 12b is formed so that an inside diameter portion of the outer ring 20b can be contacted with the contacting surface 12b. Due to the foregoing construction, an outer portion of the contacting surface 12b is formed into a relief plane 12c which is withdrawn stepwise. A pressure receiving portion 10a shown in FIG. 1 is constructed in the same manner. On the other hand, a contacting surface 16b is extendedly provided in a boss 16a of the swash plate 16, wherein the contacting surface 16b is formed so that an outside diameter portion of the inner ring 20a can be contacted with the contacting surface 16b. Due to the foregoing construction, an inner portion of the contacting surface 16b is formed into a relief plane 16c which is withdrawn stepwise.

Accordingly, when both housings 22, 24 and both cylinder blocks 10, 12 shown in FIG. 1 are jointly tightened so that the swash plate 16 is held, the interference of the axial direction is absorbed by the parallel deformation of the inner and outer rings 20a, 20b of the thrust bearing 20. A thrust load generated by the compressive reaction force given by refrigerant in accordance with the rotation of the swash plate 16, is also received the thrust bearing 20.

However, as can be seen from FIGS. 1 and 2, the inner and outer diameter surfaces of the outer ring 20b of the thrust bearing 20 are not confined, and further contacting areas of the outer ring 20b contacting with the pressure receiving portions 10a, 12a are relatively small as described above. Therefore, the outer ring 20b tends to be jointly rotated by rolling friction, and further the outer ring 20b tends to be subjected to eccentric fluctuation. For this reason, when operation is continued over a long period of time or under the condition of incomplete lubrication, since the outer ring 20b is made of high carbon chromium bearing steel, the pressure receiving portions 10a, 12a of the cylinder blocks 10, 12 commonly made of aluminum alloy such as ADC12 (JIS H5302, 1990), are quickly worn away and thrust-backlash is caused in the compressor.

In order to overcome such disadvantages, the present inventors investigated making the cylinder blocks 10, 12 of aluminum alloy disclosed in Japanese Examined Utility Model Publication (Kokoku) No. 4-41261, which comprises 4.0 to 5.0% by weight of Cu, 13.5 to 15.5% by weight of Si, 0.5% or less by weight of Mg, 1.0% or less by weight of Zn, 1.3% or less by weight of Fe, and the remainder of Al. According to the aluminum alloy disclosed in the above Japanese Examined Utility Model Publication (Kokoku) No. 4-41261, the Si content is higher than that of conventional aluminum alloy. Therefore, it can be considered that hardness of the pressure receiving portion of the cylinder block can be enhanced, so that abrasion of the pressure receiving portion can be prevented.

However, it has been made clear that satisfactory abrasion resistance can not be exhibited under a severe operating condition even when the aforementioned aluminum alloy is used. When the Si content is increased more than that of the aluminum alloy described in the above official gazette, it is difficult to conduct casting, so that the manufacturing cost is raised.

SUMMARY OF THE INVENTION

It is an object of the present invention to prevent abrasion of the pressure receiving portion without an increase of the manufacturing cost even when the outer ring is jointly rotated and eccentrically fluctuated.

In order to solve the above problem, the present invention attains to provide a new swash plate type compressor having excellent strength and abrasion resistance and a method for producing the same.

The gist of the present invention will be described hereunder.

(1) A swash-plate-type compressor having excellent strength and abrasion resistance at a pressure receiving portion, including a thrust bearing interconnected between a boss portion of a swash plate jointly driven together with a drive shaft and said pressure receiving portion formed on a cylinder block, said cylinder block comprising an aluminum alloy consisting essentially of, by weight, 1.5 to 3.5% of Cu, 13 to 16% of Si, 0.5% or less of Mg, 1.0% or less of Zn, 1.0% or less of Fe, and the remainder of Al as chemical compositions.

(2) A method for producing a swash-plate-type compressor having excellent strength and abrasion resistance at a pressure receiving portion, including a thrust bearing interconnected between a boss portions of a swash plate jointly driven together with a drive shaft and said pressure receiving portion formed on a cylinder block, comprising the steps of;

producing said cylinder block by a diecasting process of an aluminum alloy consisting essentially of, by weight, 1.5 to 3.5% of Cu, 13 to 16% of Si, 0.5% or less of Mg, 1.0% or less of Zn, 1.0% or less of Fe, and the remainder of Al as chemical compositions, an occupied area ratio of primary Si crystals in said pressure receiving portion being regulated by a cooling process, and a level of said primary Si crystals being regulated by cutting the surface of said pressure receiving portion.

DESCRIPTION OF THE PREFERRED EMBODIMENT

Figure 1:
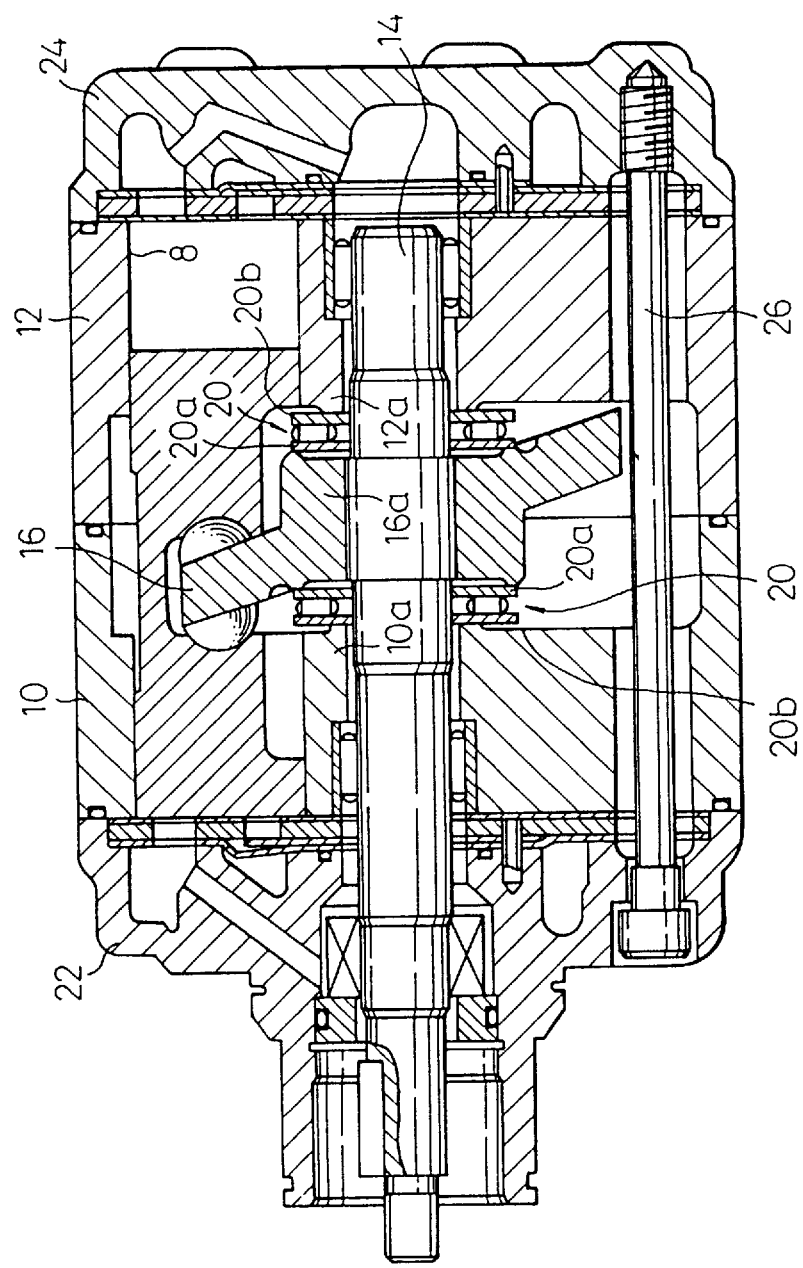
FIG. 1 is a longitudinal sectional view of the conventional swash-plate-type compressor.

The present invention attains to prevent the abrasion of the pressure receiving portion without an increase of the manufacturing cost even when the outer ring is jointly rotated and eccentrically fluctuated.

The aluminum alloy of the present invention contains less Cu than the aluminum alloy described in Japanese Examined Utility Model Publication (Kokoku) No. 4-41261. Therefore, a relatively soft matrix is formed. Accordingly, in a cylinder block composed of the aluminum alloy of the present invention, primary Si crystals which are each independently projected from the pressure receiving portion, tend to be pushed into the base material by the outer ring of the thrust bearing coming into contact with the pressure receiving section. Consequently, the levels of primary Si crystals are easily made to be uniform. As a result, in this compressor, the interference and thrust load activated from the outer ring of the thrust bearing can be appropriately supported by a large number of primary Si crystals, and the jointly rotating motion and eccentric fluctuation can be appropriately supported by a large number of primary Si crystals under severe operating conditions.

The Si content of the aluminum alloy of the present invention is not so high that mechanical working and casting can be easily carried out.

The chemical composition of the aluminum alloy of the present invention will be described below.

In the case where the Cu content is lower than 1.5% by weight, a matrix except for primary Si crystals or eutectic Si crystals becomes too soft, and it is difficult to secure the strength. On the contrary, in the case where the Cu content is more than 3.5% by weight, the matrix becomes hard, and it is difficult to provide the effect of the present invention.

In the case where the Si content is less than 13% by weight, it is similar to ADC12, and an amount of primary Si crystal is small, and it is difficult to secure the abrasion resistance property and strength. On the contrary, in the case where the Si content exceeds 16% by weight, the castability is lowered and the material becomes brittle and the mechanical workability deteriorates.

In order to improve the mechanical property, Mg, Zn and Fe are added in amounts conventionally used. Mg is effective to enhance the mechanical strength and cuttability, and the allowable limit is 0.5% by weight. Zn improves the castability when it is added by an amount smaller than an upper limit of 1.0% by weight. When Zn is added together with Mg, the mechanical strength can be enhanced. Fe enhances the mechanical strength when it is added in an amount smaller than the upper limit of 1.0% by weight. In the process of die-casting, Fe is effective for preventing the casting sticking to the dies.

Mg, Zn and Fe are included as impurities contained in aluminum material, however, the allowable limits must be determined as described above. Further, impurities such as Mn, Ni, Cr, Ti, B, Ca and Na are included as they enter from aluminum material. However, when they are included in a trace quantity which is allowed in the usual standard they do not affect the present invention.

EXAMPLE

An example of the present invention will be explained as follows.

Figure 2:
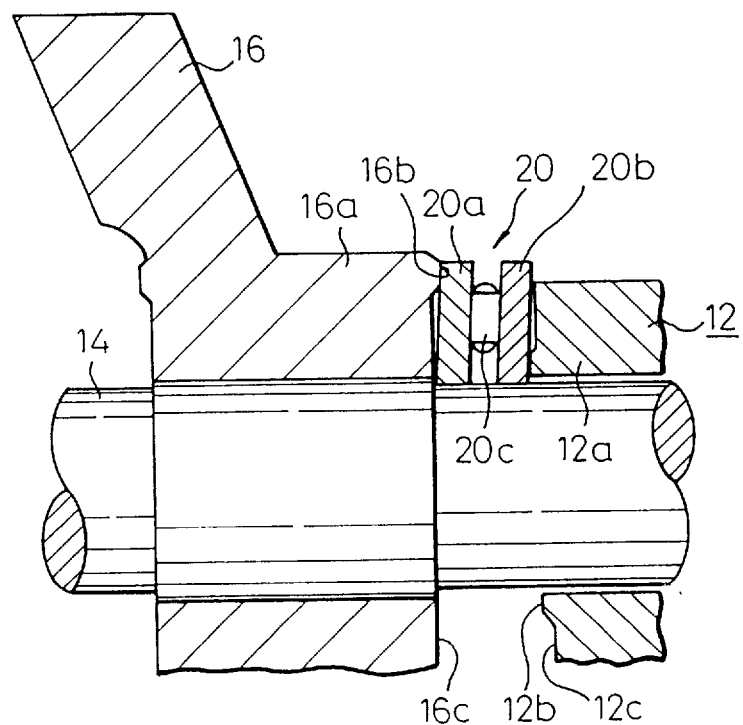
FIG. 2 is an enlarged sectional view showing a primary portion of the conventional swash-plate-type compressor.

The compressor of the present invention is the same as the conventional compressor shown in FIGS. 1 and 2 except for the material composing a cylinder block. Therefore, the same reference numerals are used, and explanations are made with reference to FIGS. 1 and 2.

The cylinder blocks 10, 12 of this compressor are made of aluminum alloy including 2.0% by weight (referred to as % hereinafter) of Cu, 15.0% of Si, 0.2% of Mg, 0.5% of Zn, 0.9% of Fe, and the remainder of Al. This aluminum alloy is subjected to die-casting under the casting condition shown in Table 1 so that the cylinder blocks 10, 12 are formed by mono-block forming.

TABLE 1

| Item of Condition | Value of Condition |
| --- | --- |
| Mold Clamp Force (Ton) | 630 |
| Casting Temperature (°C.) | 660 |
| Mold Temperature (°C.) | 120 to 140 |
| Gauge Pressure (kg/cm$^2$) | 300 |
| Plunger Rate (m/sec) | 2.5 to 3.0 |
| Chill Time (sec) | 8.5 |
| Shot Cycle (sec) | 50 |

As the Si content of the aluminum alloy of the present invention is not very high, and, as can be seen from the casting and mold temperatures shown in Table 1, the casting operation can be easily carried out.

The general properties of the aluminum alloy of the present invention formed by means of die-casting are shown in Table 2.

TABLE 2

| Characteristics | Value |
| --- | --- |
| Solidification Range (°C.) | 538 to 610 |
| Thermal Expansion Coefficient (/°C.) | $18.8 \times 10^{-6}$ |
| Tensile Strength (kg/mm$^2$) | 26.3 |
| Elongation (%) | 1.0 |
| Impact Value (kg · m/cm$^3$) | 0.4 to 0.7 |
| Hv Hardness | 85 to 110 |
| Specific Gravity (g/cm$^3$) | 2.7 |

According to the tensile strength, elongation, impact value and Hv hardness shown in Table 2, it can be seen that the matrix, except for primary silicon crystal in the aluminum alloy of the present invention, is softer than that of the aluminum alloy described in Japanese Examined Utility Model Publication (Kokoku) No. 4-41261. The reason is that the Cu content of the aluminum alloy of the present invention is lower than that of the aluminum alloy described in the prior art.

Evaluation;

As a comparative example, a compressor was prepared, the cylinder blocks 10, 12 of which were made of aluminum alloy described in Japanese Examined Utility Model Publication (Kokoku) No. 4-41261, and other components were the same as those of the embodiment of the present invention. Using the compressor of the example of the present invention and that of the comparative example, a continuous running test was carried out, under the condition of nonlubrication, while the running speed was maintained at 700 rpm for 100 hours. The outer rings 20b of the thrust bearings 20 of each compressor were made of SUJ2 (JIS G4805, 1965). After the completion of the test, abrasion amounts (μm) of the pressure receiving portions 10a, 12a of the cylinder blocks 10, 12 of these compressors were measured. The results of measurement are shown in Table 3.

TABLE 3

|  | Abrasion Amount of Pressure Receiving Portion |
| --- | --- |
| Present invention | Not more than 20 μm |
| Comparative Example | About 80 μm |

The following can be seen from Table 3. In the compressor of the present invention, even when the outer ring is subjected to joint rotation or eccentric fluctuation under a severe running condition, the pressure receiving portion of the compressor of the embodiment is not easily worn away compared with the compressor of the comparative example.

The reason is described as follows. In the cylinder blocks 10, 12 of the compressor of the present invention, primary Si crystals which each independently project from the pressure receiving portions 10a, 12a, tend to be pushed into the base material by the outer ring 20b, of the thrust bearings 20, coming into contact with the pressure receiving portions. Consequently, the levels of the primary Si crystals are easily made to be uniform. Further, the primary Si crystals are less susceptible to chipping in cutting work, so that occupied area ratio of the primary Si crystals is increased. Since the primary Si crystals do not protrude, the life of a working bite is extended. As a result, in the compressor of the present invention, the interference and thrust load from the outer rings 20b of the thrust bearings 20, 20 can be appropriately supported by a large number of primary Si crystals, and the jointly rotating motion and eccentric fluctuation can be appropriately supported by a large number of primary Si crystals under a severe operating condition.

Consequently, according to the compressor of the present invention, the manufacturing cost is not raised, and abrasion of the pressure receiving portions 10a, 12a can be reduced even under severe operating conditions.

In this connection, the same abrasion test was carried out using a compressor in which the cylinder blocks 10, 12 were made of the conventional aluminum alloy ADC12. As a result of the test, the pressure receiving portions 10a, 12a wore away and the abrasion amount was 150 to 180 μm. On the other hand, in the compressor of the embodiment in which the abrasion amounts of the pressure receiving portions 10a, 12a are small, the abrasion amount of a cylinder bore 8 is also small. Therefore, it is not necessary to insert a liner into the cylinder bore. Accordingly, the weight of the compressor can be reduced, and the number of parts can be reduced.

The compressor of the present invention provided the following effects. The amounts of casting strain of the cylinder blocks 10, 12 were small, and further a dimensional change was small after the relief of residual stress.

Test;

The cylinder blocks 10, 12 are manufactured under the condition that the Cu content is determined to be 1 to 4% and other conditions are the same as those of the example. After that, the cylinder blocks 10, 12 are assembled to the compressor.

Each compressor was subjected to an actual endurance test, and the abrasion amounts of the pressure receiving portions 10a, 12a were measured. The results of the measurement are shown in FIG. 3.

Figure 3:
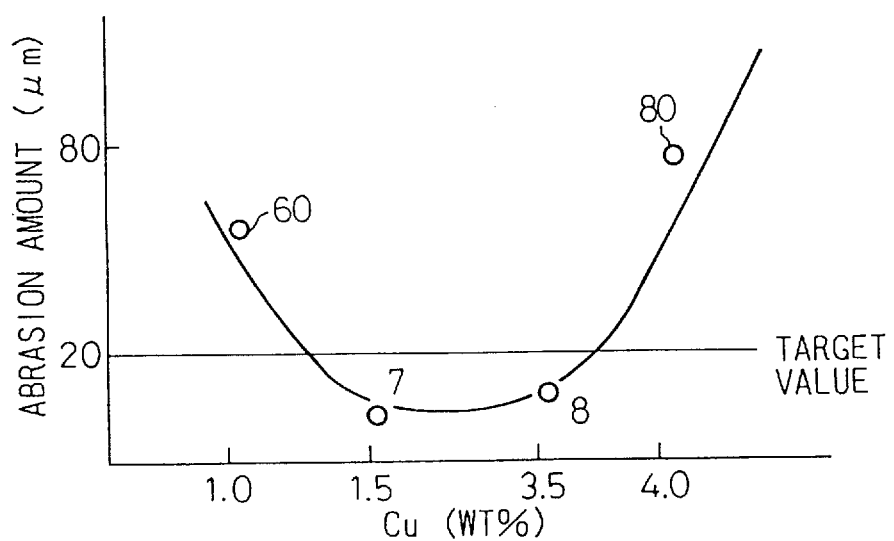
FIG. 3 is a graph showing a relation between an amount of Cu and an amount of abrasion in the test.

The following can be seen from FIG. 3. When the Cu content is less than 1.5%, it is difficult to maintain the mechanical strength of the cylinder blocks 10, 12, so that abrasion tends to occur. On the contrary, when the Cu content exceeds 3.5%, the cylinder blocks 10, 12 becomes too hard, so that abrasion tends to occur.

According to the test, when the constitution described in the claim is adopted, the effects of the present invention can be provided even when errors caused in the process of mass-production are taken into consideration.

As described in detail, in the swash-plate-type compressor of the present invention, the cylinder blocks are composed of aluminum alloy described in the claim and therefore, abrasion of the pressure receiving portions can be reduced without an increase in the manufacturing cost even when the outer rings are jointly rotated and eccentrically fluctuated.

We claim:

1. A swash-plate-type compressor having excellent strength and abrasion resistance at a pressure receiving portion, including a thrust bearing interconnected between a boss portion of a swash plate jointly driven together with a drive shaft and said pressure receiving portion formed on a cylinder block, said cylinder block comprising an aluminum alloy consisting essentially of, by weight, 1.5 to 3.5% of Cu, 13 to 16% of Si, 0.5% or less of Mg, 1.0% or less of Zn, 1.0% or less of Fe, and the remainder of Al as chemical compositions, and in said pressure receiving portion at which said thrust bearing is interconnected, primary Si crystals being projected from a surface of a base material and said thrust bearing being interposed in said cylinder block while making the level of said primary Si crystals uniform and supporting an interference and thrust load with said primary Si crystals.

2. A swash-plate-type compressor having excellent strength and abrasion resistance at a pressure receiving portion according to claim 1, wherein said cylinder block has a Vickers Hardness of 85 to 100.

3. A method for producing a swash-plate-type compressor having excellent strength and abrasion resistance at a pressure receiving portion, including a thrust bearing interconnected between a boss portion of a swash plate jointly driven together with a drive shaft and said pressure receiving portion formed on a cylinder block, comprising the steps of;

said cylinder block being produced by a die-casting process of an aluminum alloy consisting essentially of, by weight, 1.5 to 3.5% of Cu, 13 to 16% of Si, 0.5% or less of Mg, 1.0% or less of Zn, 1.0% or less of Fe, and the remainder of Al as chemical compositions, and said pressure receiving portion being subjected to a surface-working process so that Si primary crystals are projected from a surface of a base material.

* * * * *